United States Patent [19]

Katsuoka et al.

[11] 3,988,600
[45] Oct. 26, 1976

[54] DIGITAL LOGARITHMIC FUNCTION GENERATOR

[75] Inventors: Ritsu Katsuoka, Okazaki; Hisasi Kawai, Toyohashi, both of Japan

[73] Assignee: Nippon Soken, Inc., Nishio, Japan

[22] Filed: May 29, 1975

[21] Appl. No.: 581,886

[30] Foreign Application Priority Data
June 25, 1974 Japan............................. 49-72938

[52] U.S. Cl........................... 235/150.53; 235/156; 235/92 CC
[51] Int. Cl.²......................................... G06F 15/34
[58] Field of Search............... 235/197, 150.53, 152, 235/156, 150.21, 92 CC, 92 PE, 92 CV

[56] References Cited
UNITED STATES PATENTS

| | | | |
|---|---|---|---|
| 3,402,285 | 9/1968 | Wang | 235/197 |
| 3,436,533 | 4/1969 | Moore et al. | 235/197 |
| 3,654,450 | 4/1972 | Webb | 235/197 |
| 3,698,631 | 10/1972 | Drechsler | 235/156 |
| 3,866,024 | 2/1975 | Williams | 235/92 CC |

*Primary Examiner*—Joseph F. Ruggiero
*Attorney, Agent, or Firm*—Cushman, Darby & Cushman

[57] ABSTRACT

A digital logarithmic function generator comprising a converter circuit for producing an output signal which is proportional to the number of input signals, a setting circuit the content $n$ of which is changed each time the output voltage of said converter circuit changes by a fixed amount $V_o$, and a modulator circuit for frequency modulating a clock signal train of a constant frequency with said content $n$ to produce an output signal train the period of which varies proportionally with $2^{nV_o}$, the output signal train of said modulator circuit being applied to said converter circuit as the input signal thereto. The present digital logarithmic function generator is useful in various control systems, such as an electronically controlled fuel injection system, in which an electrical signal which is logarithmically related to time is required.

3 Claims, 4 Drawing Figures

DIGITAL LOGARITHMIC FUNCTION GENERATOR

BACKGROUND OF THE INVENTION

1. Field of the Invention

The present invention relates to a digital logarithmic function generator for generating a fragmental graph approximated logarithmic function with time as a variable, by performing frequency modulation under digital control. The function generator of the present invention is useful in various control systems, such as an electronically controlled fuel injection system, which require electrical signals logarithmically related to time.

2. Description of the Prior Art

The prior art logarithmic function generators of the above type include, for example, an analog type device which makes use of a logarithmic voltage to current characteristic of a diode to produce an output voltage which is logarithmically related to an input voltage, and a digital type device which generates an approximation of a logarithmic function by a progression development of the logarithmic function. In the analog type device, because of the non-uniformity in the diode characteristic, it is difficult to obtain a logarithmic function generator of uniform characteristic. In addition, since the diode characteristic is apt to be changed with temperature, there is a drawback in that the logarithmic function voltage generated is unstable.

In the digital type device, there are drawbacks in that complex arithmic operation circuits are required to execute the development formula and a large-scale and complex circuit configuration is required to accomplish a high precision operation.

SUMMARY OF THE INVENTION

The present invention intends to overcome the above drawbacks in the prior art devices, and it is an object of the present invention to provide a digital logarithmic function generator comprising a converter circuit for producing an output voltage which is proportional to the number of input signals, a setting circuit the content $n$ of which is changed each time said output voltage from said converter circuit changes by a fixed amount $Vo$, and a modulator circuit for frequency modulating a clock signal train of a constant frequency with said content $n$ to produce an output signal train the period of which varies proportionally with $2^{nVo}$, the output signal train from said modulator circuit being applied to said converter circuit as the input thereto to perform the frequency modulation under digital control for attaining the fragmental graph approximation, whereby the logarithmic function generator operates stably irrespective of the change in temperature and the non-uniformity in component characteristics, and can produce a high precision logarithmic function voltage with time as a variable with a simple circuit configuration.

These and other objects, features and advantages of the present invention will become more apparent from the following detailed description of a preferred embodiment of the present invention when taken in conjunction with the accompanying drawings.

DESCRIPTION OF THE PREFERRED EMBODIMENT

Figure 1:
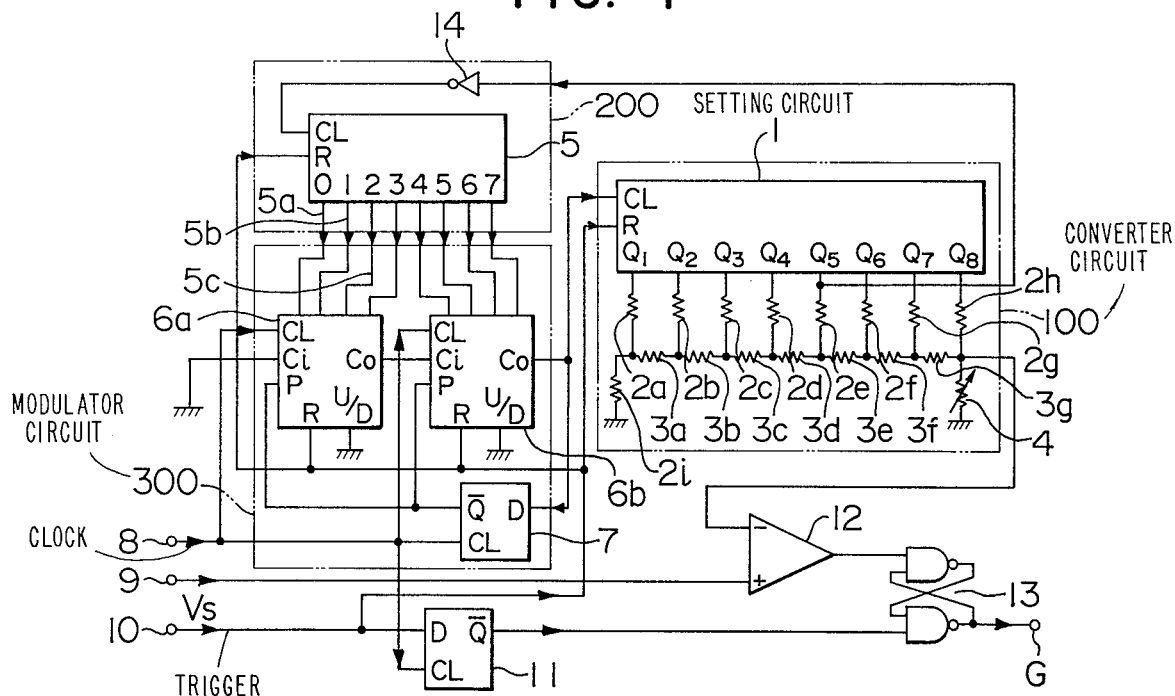
FIG. 1 is an electrical circuit diagram illustrating an embodiment of the present invention.

The present invention will now be explained in detail in conjunction with a preferred embodiment thereof shown in the drawings. Referring to FIG. 1, 100 designates a converter circuit for producing an output voltage which is proportional to the frequency of an input signal, 200 designates a setting circuit the content $n$ of which is changed each time the output voltage from the converter circuit 100 changes by a fixed amount $Vo$, and 300 designates a modulator circuit for frequency modulating a clock signal train of a constant frequency with said content. More particularly, the converter circuit 100 comprises a binary counter 1 having 8-digit binary outputs (RCA CD4040), resistors 2a to 2h each having resistance 2R and connected to the respective output of the binary counter 1, resistors 3a to 3g each having resistance R and connected between adjacent two of the resistors 2a to 2h, a resistor 2i having resistance 2R and connected to ground, and a potentiometer 4 for adjusting a factor. The setting circuit 200 comprises a decimal frequency dividing counter 5 (RCA CD4017) and an inverter 14 connected between a fifth digit output $Q_5$ of the binary counter 1 and a clock terminal (CL) of the decimal frequency dividing counter 5. The modulator circuit 300 comprises presettable up-down counters 6a, 6b (Motorola MC14516) and a D flip-flop for delaying the signal. The outputs of the decimal frequency dividing counter 5 are connected sequentially from 0 address to higher address to the preset input terminals of the presettable up-down counters 6a and 6b. The count control terminals (up/down) of the presettable up-down counters 6a and 6b are grounded to render the presettable up-down counters 6a and 6b to be operated in count-down mode, and the carry input terminal (Ci) of the presettable up-down counter 6a is grounded and the carry output terminal (Co) thereof is connected to the carry input terminal (Ci) of the succeeding presettable up-down counter 6b. In this manner, the presettable reversible counters 6a and 6b are cascade-connected to perform 8-digit count-down operation. Thus, when the decimal output (setting) of the decimal frequency dividing counter 5 is $n$, the preset value of the presettable up-down counters 6a and 6b (hereinafter simply referred to as a presettable counter 6) is $2^n$ so that the presettable counter 6, after it has been so preset, produces a down level signal at its carry output terminal (Co) only when $2^n$ clock signals are applied to its input (CL). The carry output terminal (Co) of the presettable counter 6 is connected to the control terminal (D) of the D flip-flop 7, and an inverted output terminal $\overline{Q}$ of the D flip-flop 7 is fed back to the preset terminal ($p$) of the presettable counter 6. The reference numerals 8, 9 and 10 designate terminals for receiving clock signals of constant frequency, a setting voltage and a triggering signal, respectively. Further, in the present embodiment, as shown in FIG. 1, a D flip-flop 11 for delaying the signal, a comparator 12 and an R-S flip-flop 13 are provided to produce a pulse signal the duration of which is logarithmically related to the setting voltage applied to the terminal 9.

Figure 2:
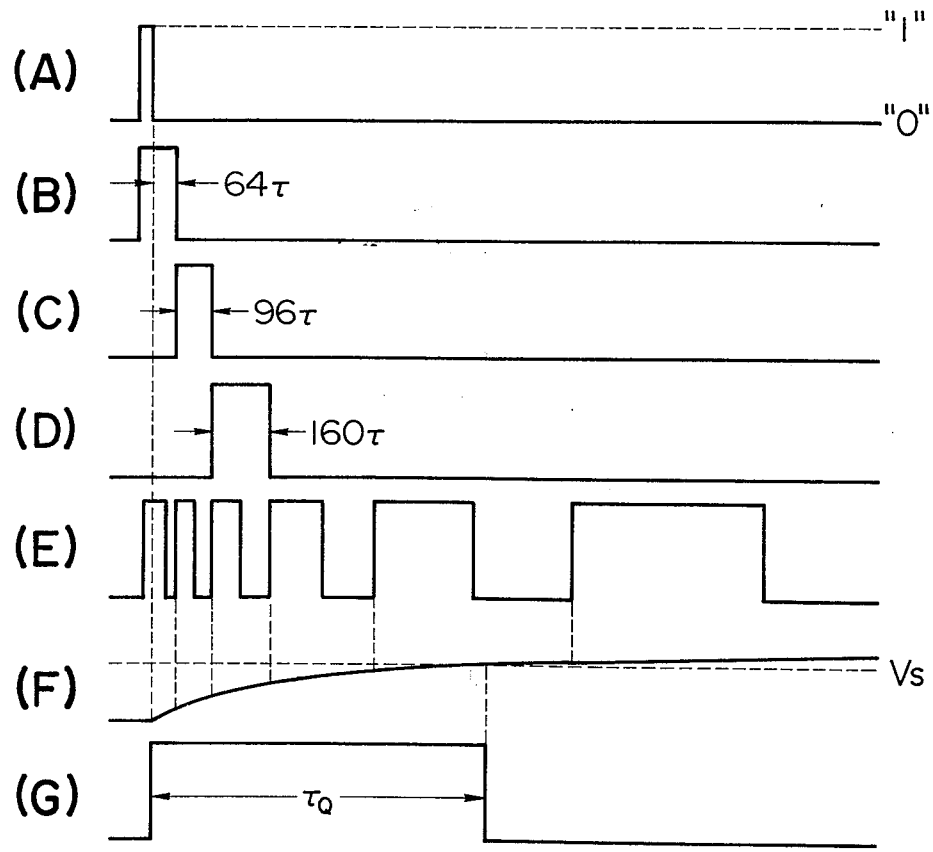
FIGS. 2, 3 and 4 show signal waveforms at various points which are useful to explain the operation of the present invention.
Figure 3:
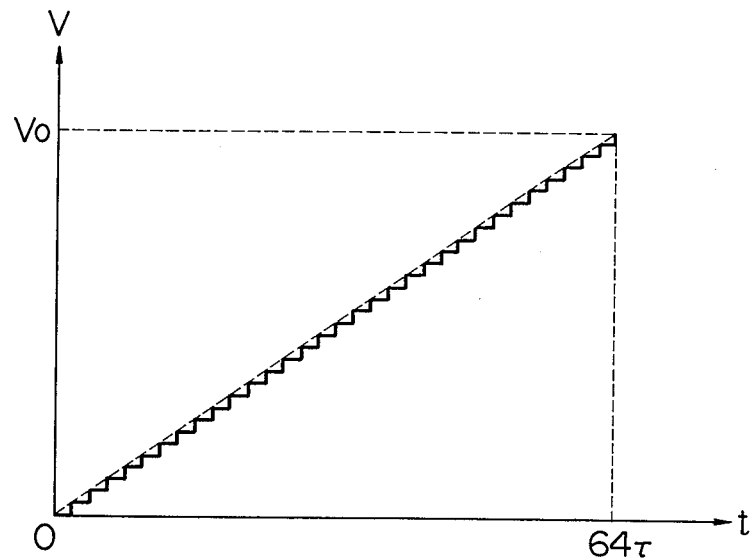
Figure 4:
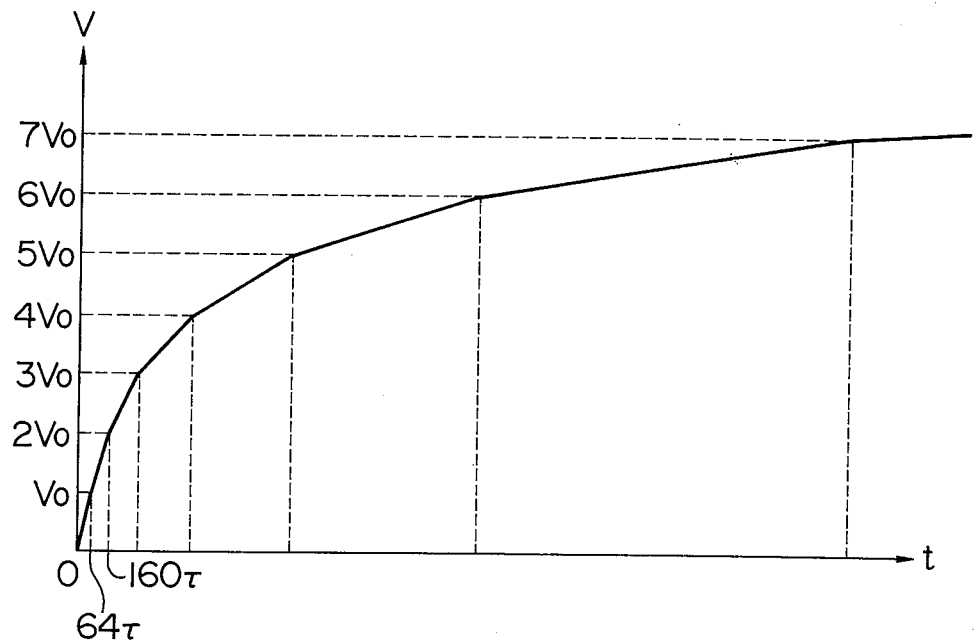

The operation of the present system of the above construction will now be explained with reference to FIGS. 2, 3 and 4. When a triggering signal as shown in FIG. 2(A) is applied to the terminal 10, the binary counter 1, the presettable counter 6 and the decimal frequency dividing counter 5 are all reset and the outputs ($\theta_1 \ldots \theta_8$) of the binary counter 1 all assume down level (which is hereinafter simply referred to as logical signal "0"), and the No. 0 output terminal 5a of the decimal frequency dividing counter 5 assumes up level (hereinafter simply referred to as logical signal "1") resulting in zero content. That is, the preset value of the presettable counter 6 is one. On the other hand, when one clock time ($\tau$) of the clock signals of the constant frequency applied to the terminal 8 (hereinafter simply referred to as first clock signals, the period of which is $\tau$) is elapsed after the triggering signal has been applied, the D flip-flop 11 produces 0 output at its inverted output terminal $\overline{Q}$ to set the R-S flip-flop 13 so that the output terminal G of the R-S flip-flop 13 produces 1 output. Since the presettable counter 6 has been preset to one, when one of the first clock signals is applied to the clock input terminal (CL) the carry output terminal (Co) changes from 1 to 0 and the D flip-flop 7 produces 1 at its inverted output terminal $\overline{Q}$ after one clock time $\tau$ of the first clock signals has been elapsed, and the presettable counter 6 sets the preset value. Since the clock input terminal (CL) of the decimal frequency dividing counter 5 remains 1 at this time, the No. 0 output terminal 5a remains at 1 level so that the preset value of the presettable counter 6 is one. Therefore, when one of the first clock signals is applied to the clock input terminal (CL) of the presettable counter after the D flip-flop 7 has produced 1, the carry output terminal (Co) again changes from 1 to 0. In this manner, so long as the decimal frequency dividing counter 5 sets the preset value of the presettable counter 6 to one, a clock signal (hereinafter simply referred to as second clock signal) is applied from the presettable up-down counter 6 to the binary counter 1 for every two clocks of the first clock signals. That is, while the preset value of the decimal frequency dividing counter 5 is one, the period of the second clock signal to the binary counter 1 is $2\tau$. Each time a second clock signal from the presettable counter 6 is applied to the binary counter 1, the outputs $Q_1 \ldots Q_8$ change to 1 correspondingly to the number of the second clock signals. One output $Q_5$ thereof changes to 1 after 16 second clock signals have been applied. After the binary counter 1 has been reset by the triggering signal (see FIG. 2(A)), each time a second clock signal is applied, the output voltage (at the junction of the resistor 2h and the potentiometer 4) of the converter circuit 100 increments to produce a step function waveform which increases linearly as shown in FIG. 3 and which can be regarded as an output voltage V which is proportional to time $t$. When the output $Q_5$ of the binary counter 1 changes to 1, 0 is applied to the input terminal (CL) of the decimal frequency dividing counter 5 through the inverter 14, and when sixteen second clock signals are applied 1 is applied to the clock input terminal of the decimal frequency dividing counter 5 so that a clock signal (hereinafter referred to as third clock signal) is produced. Thus the decimal frequency dividing counter 5 produces 1 at its No. 1 output terminal 5b to change the preset value to two. That is, when the output voltage of the converter circuit 100 changes by a fixed amount Vo, the setting circuit 200 changes its content. The presettable counter is preset to the count two, which corresponds to the setting one of the decimal frequency dividing counter 5 in response to 1 synchronized with the first clock signal from the inverted output terminal $\overline{Q}$ of the D flip-flop 7, and when two first clock signals are applied thereafter the carry output terminal (Co) changes to 0 so that the D flip-flop 7 produces 1 at its inverted output terminal $\overline{Q}$ with a delay of one clock time $\tau$ of the first clock signals. At this time, the presettable counter 6 is preset to two correspondingly to the content one of the decimal frequency dividing counter 5. So long as the content of the decimal frequency dividing counter 5 remains unchanged, the presettable counter 6 and the D flip-flop 7 repeat the above operation and the period of the second clock signals applied to the binary counter 1 becomes $3\tau$. That is, the second clock signals to the converter circuit 100 is frequency modulated by the modulating circuit 300. On the other hand, each time a second clock signal having the period $3\tau$ is applied, the output voltage of the converter circuit 100 gradually rises from Vo (volts) in proportion with time $t$, and when 32 second clock signals having the period $3\tau$ are applied the output voltage reaches to 2 Vo (volts). It is apparent that the time required for the output voltage V to change from Vo to 2 Vo corresponds to 96 $\tau$. In the same manner, each time the output voltage of the frequency to voltage converter circuit 100 rises by Vo (volts), a third clock signal is applied to the setting circuit 100 so that 1 level is sequentially produced at the respective output terminals 5a, 5b, 5c ... of the decimal frequency dividing counter 5 as shown in FIGS. 2 (B), (C), (D) after the triggering signal input. At the same time, the preset value of the presettable counter 6 changes to $2^n$ each time the content $n$ of the decimal frequency dividing counter 5 changes. In this manner, after the triggering signal input, the preset value changes in accordance with a geometric progression such as 1, 2, 4, 8, 16, 32, 64, 128. The presettable counter 6 counts down the first clock signal inputs from the preset value and when the number of the first clock signals coincides with the preset value the output terminal (Co) produces 0. The period for the presettable counter 6 to produce 0 is $2\tau$ and $3\tau$ when the preset values are one and two, respectively, as stated above, and in general the period is given by $(2^n + 1)\tau$ for the preset value $2^n$. Thus, the periods of the second clock signals after the triggering signal input form a progression of $2\tau$, $3\tau$, $5\tau$, $9\tau$, $17\tau$, $33\tau$, $65\tau$, $129\tau$ depending on the preset value, the period changing by $2^n\tau$. The change of the content $n$ in the setting circuit 200 occurs at the leading edge of the third clock signal applied to the decimal frequency dividing counter 5. Since the third clock signal is produced from the fifth digit position $Q_5$ through the inverter 14, the change of the content occurs each time the binary counter 1 has counted 32 second clock signals. On the other hand, since the signal produced at the carry output terminal Co of the presettable counter 6 is applied as the second clock signal to the binary counter 1, the times required for counting 32 second clock signals after the triggering signal input are $32 \times 2\tau$, $32 \times 3\tau$, $32 \times 5\tau$, $32 \times 9\tau$, $32 \times 17\tau$, $32 \times 33\tau$, $32 \times 65\tau$, $32 \times 129\tau$ and they are expressed by a general formula $32\tau \cdot (2^n + 1)$. Thus, the period of the third clock signals applied to the decimal frequency dividing counter 5 increases with time as shown in FIG. 2(E). That is, the output voltage of the converter circuit 100 follows a linearly increasing step function waveform similar to that shown in FIG. 3 while the content of the setting circuit 200 remains constant, with the voltage increment being always Vo (volts). The output voltage V of the converter circuit 100 is thus a cascade combination of the linear step function waveforms with the gradient thereof varying with time to $$\frac{V_o}{32 \times 2\tau}, \frac{V_o}{32 \times 3\tau}, \frac{V_o}{32 \times 5\tau}, \frac{V_o}{32 \times 9\tau}, \frac{V_o}{32 \times 17\tau}, \frac{V_o}{32 \times 33\tau}, \frac{V_o}{32 \times 65\tau}, \frac{V_o}{32 \times 129\tau},$$

as shown in FIG. 2(F) and FIG. 4 (which shows FIG. 2(F) in an enlarged scale). Now assuming a function $V = \log 2 \, t$, the time required for Vo to increase by the constant amount Vo from $nVo$ to $(n+1)Vo$ is given by $\Delta t = A \cdot 2^{nVo}$, where $A$ is a constant, and the change of $\Delta t$ for each change by the constant amount Vo is $A(2^{Vo} - 1) \cdot 2^{nVo}$.

On the other hand, the time required for counting 32 second clock signals is $32 \, \tau \cdot (2^n + 1)$ as described above, and this time changes to $32 \, \tau \cdot 2^n$ for each change by the constant voltage Vo of the converter circuit 100. It is noted that this corresponds to the previous expression $(2^{Vo} - 1) \cdot 2^{nVo}$, where A is substituted by $32 \, \tau$ and Vo is substituted by 1. Accordingly, the fragmental graph waveform of the output voltage of the converter circuit 100 follows a function $V = \log 2 \, t$ and it approximates to a function curve $V = K \log a \, (t + t_1) + V_1$, where $K$, $t_1$ and $V_1$ are constants and $K$ can be adjusted by the factor adjusting potentiometer 4.

The logarithmic function voltage of the fragmental graph approximation as shown in FIG. 2(F) generated in the manner described above is applied to an inverting input terminal (−) of the comparator 12, a non-inverting input terminal (+) of which receives the set voltage $V_s$ through the terminal 9. Thus, after the triggering signal input, the output voltage $V$ of the converter circuit 100 gradually increases as shown in FIG. 2(F) and when the condition $V \geq V_s$ is met the output of the comparator 12 switches from 1 to 0 to reset the R-S flip-flop 13. The output, node G, of the R-S flip-flop 13 now produces a pulse signal having the duration $\tau Q$ as shown in FIG. 2(G). In this case, between $\tau Q$ and $V_s$, there exists in approximation a logarithmic relation of $V_s = K \log (\tau Q + t_1) + V_1$. The R-S flip-flop 13 is included here in order to prevent chattering from occuring at the output of the comparator 12, which chattering might otherwise occur as the clock frequency to the binary counter 1 increases such that the signal propagation time in the binary counter 1 is not neglected and the step function wave voltage shown in FIG. 3 produced at the output of the converter circuit 110 includes narrow pulsive noise causing the chattering. Such chattering can be eliminated by connecting the R-S flip-flop 13 to the output of the comparator 12 because once the output of the comparator 12 has switched from 1 to 0 the output of the R-S flip-flop 13 is kept at 0 until the next triggering signal is applied to the set input of the R-S flip-flop 13.

In the present embodiment, when the clock signal frequency of 2,097,152 KHz with the supply voltage of the binary counter 1 being 6 volts, the approximation error with respect to a calculated value was proved to be within than ±4 % over the range 4 ms > $\tau Q$ > 150 μs. It is thus seen that the logarithmic function voltage with time as a variable is produced with high precision.

While the logarithmic function voltage was approximated by light linear step function voltages in the above embodiment, it is possible to produce a logarithmic function voltage of higher precision fragmental graph approximation by increasing the numbers of digit positions of the binary counter 1, decimal frequency dividing counter 5 and presettable counter 6.

Further, when inverters are connected to the respective outputs $Q_1, Q_2, \ldots Q_8$ of the binary counter 1, a function voltage which logarithmically decrease with time as a variable, that is, the function voltage $V = -K \log (\tau Q + t_1) + V_1$ may be produced.

While the first clock signal to the presettable counter 6 was commonly used as the clock signal to the signal delaying D flip-flops 7 and 11 in the above embodiment, the present invention may be embodied using clock signals of different frequencies, in which case by changing the respective frequency relations it is possible to adjust the constants $t_1$ and $V_1$ in the above approximation function $V = K \log (t + t_1) + V_1$. By selecting the period of the first clock signal to the presettable counter 6 to be sufficiently larger than the period of the clock signal to the D flip-flops 7 and 11, it is apparent that a function $V \approx K \log t$ may be realized.

Although relative precision for the resistors constituting a ladder type resistor network in the frequency-to-voltage converter circuit 100 should be maintained at a high level, the absolute values of the resistances are not so critical and the output voltage depends only on the supply voltage to the binary counter 1, minimizing the influence by the non-uniformity in the components. Similarly, since there is a trend for the temperature characteristics of the individual resistors to be cancelled with each other, the instability of the overall system which would otherwise be caused by temperature change may be eliminated.

While the frequency of the second clock signal to the binary counter was controlled to change the gradient of the step function voltage, this control is performed by the frequency modulation with the decimal frequency dividing counter 5, the presettable counter 6 and the signal delaying D flip-flop 7 so that the circuit configuration can be extremely simplified.

In addition, since the pulse signal having the duration $\tau Q$ can be readily produced, it is possible to produce a clock signal which is proportional to the output duration $\tau Q$ by counting the number of clock pulses received within the time interval $\tau Q$. Thus, the present system may be rendered to have analog-to-digital conversion function.

As described hereinabove, the present invention provides a digital logarithmic function generator comprising a converter circuit for generating an output voltage which is proportional to the number of input signals, a setting circuit the content $n$ of which is changed each time said output voltage from said converter circuit changes by a fixed amount Vo, and a modulator circuit for frequency modulating a clock signal train of a constant frequency with said content $n$ produce an output signal train the period of which varies proportionally with $2^{nVo}$, the output signal from said modulator circuit being applied to the frequency-to-voltage converter circuit as the input signal thereto to perform the frequency modulation under the digital control for attaining the fragmental graph approximation. Accordingly, the present logarithmic function generator offers the advantages in that it operates stably irrespective of change in temperature and the nonuniformity in the component characteristics and can produce a high precision logarithmic function voltage with time as a variable with a simple circuit configuration.

What is claimed is:

1. A digital logarithmic function generator comprising a converter circuit for producing an output voltage which is proportional to the number of input signals, a setting circuit connected to said converter circuit, the content $n$ of said setting circuit being changed each time said output voltage from said converter circuit changes by a fixed amount $Vo$, and a modulator circuit connected to said setting circuit for frequency modulating a clock signal train of a constant frequency with said content $n$ to produce an output signal train the period of which varies proportionally with $2^{nVo}$, said converter circuit being connected to said modulator circuit, the output signal train from said modulator circuit being applied to said converter circuit as the input signal thereto, whereby a logarithmic function of a fragmental graph approximation with time as a variable is produced.

2. A logarithmic function generator according to claim 1 further including a comparator circuit connected to said converter circuit for comparing the logarithmic function voltage from said converter circuit with an arbitrarily set voltage to produce a pulse signal the duration of which is logarithmically related to said set voltage.

3. A digital logarithmic function generator comprising a first counter means for counting the number of input signals, a second counter means connected to said first counter means for incrementing said second counter means' integer content $n$ by one each time the content of said first counter means reaches a preset count, and a third counter means connected to said second counter means for producing an output signal train, the period of which increases in proportion with $2^n$ each time the content of said second counter means changes from $n$ to $(n+1)$, said third counter means producing a plurality of repetition pulses while the content of said second counter means remains constant, said first counter means receiving said output signal train of said third counter means as the input signal thereto, whereby a logarithmic function of a fragmental graph approximation with time as a variable is produced.

* * * * *